June 3, 1958   H. M. FOX   2,836,963
BAG OR BLADDER FLEXIBLE AT LOW TEMPERATURES
Filed Feb. 28, 1955
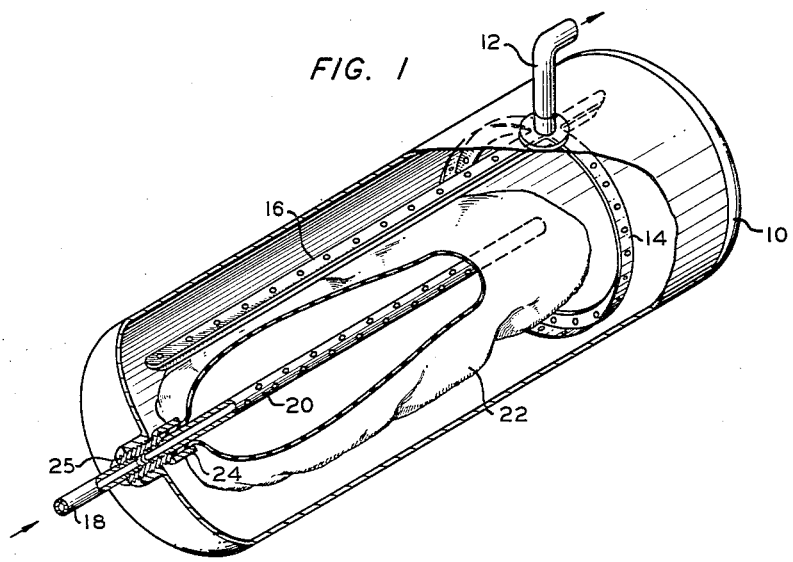
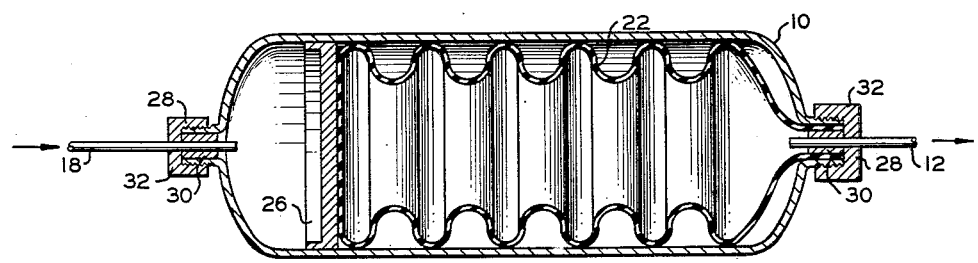
INVENTOR.
H. M. FOX
BY *Hudson & Young*
ATTORNEYS United States Patent Office 2,836,963
Patented June 3, 1958

2,836,963

BAG OR BLADDER FLEXIBLE AT LOW
TEMPERATURES

Homer M. Fox, Bartlesville, Okla., assignor to Phillips
Petroleum Company, a corporation of Delaware Application February 28, 1955, Serial No. 490,822

8 Claims. (Cl. 62—1)

This invention relates to bags or bladders for service at temperatures down to about −300° F., such as are encountered in dispensing liquid oxygen. A specific aspect of the invention pertains to rocket propellant expellant bags or bladders for low temperature liquefied propellants.

The principal object of the invention is to provide a bag or bladder of a composition suitable for use in contact with liquids at temperatures of the order of −300° F. Another object of the invention is to provide a rocket propellant expellant bag or bladder which is flexible and impervious at the temperature of vaporizing liquid oxygen. Another object of the invention is to provide an improved rocket propellant tank suitable for low temperature service. Other objects of the invention will become apparent from a consideration of the accompanying disclosure.

In small liquid-propellant rockets, the propellant is usually forced from the tank to the rocket motor by means of gas pressure. In the operation of guided rockets against aircraft or other rapidly moving targets, it may be necessary for the missile to make sudden turns. If this should occur while the tanks are only partly filled with propellant, the motion of the missile will throw the liquid to one side of the tank, and may uncover the outlet and interrupt the flow of propellant to the motor. To prevent this from occurring the gas is usually introduced into a collapsed bag or bladder contained in the tank of liquid. The bag unfolds or expands as the gas enters it, and forces the liquid from the tank. As the gas and the liquid are separated by the bladder it is impossible for any gas to enter the propellant lines until all the liquid has been expelled and the bladder bursts. This insures a continuous supply of propellant to the motor regardless of the position or direction of the missile or the accelerations acting on it.

Attaching the bladder to the pressurizing line is usually not a great problem, as the fittings can be made of stainless steel and the bladder attached by clamping. Since the bladder is to be installed in the propellant tank in a folded or collapsed condition, its bulk subtracts from the amount of liquid which the tank can contain. Material which is of light gage and easily folded is therefore desirable.

The material used for bladders must meet exacting requirements. First of all it must be compatible with the liquid in which it is used. It must neither be attacked appreciably by the liquid during the time of contact, nor cause decomposition or other harmful change in the propellant. It must be non-reactive and flexible over the entire range of temperature to which the loaded rocket may be subjected in storage or service.

An interesting example of bladder development resulted from the need for an explusion bladder for use in liquid oxygen. Oxygen boils at −298° F. under atmospheric pressure, and the ordinary gas-tight materials, such as rubber and plastics, are hard and brittle at this temperature. With fibrous materials this difficulty is not encountered; e. g., both cotton and nylon cloth are quite flexible in liquid oxygen, but cannot be used because they are not gas-tight. Up to the present, any attempt to impregnate them involved the use of a material which is not flexible in liquid oxygen.

I have discovered that certain hydrogenated polybutadienes make excellent bags or bladders for use in contact with extremely low temperature fluids. The type of material disclosed herein lends itself to easy fabrication in thin films which are strong, inert, and flexible at temperatures of the order of −300° F. These characteristics of the hydrogenated polybutadienes disclosed herein render the same suitable for use in dispensing liquefied gases such as liquid oxygen at the vaporizing temperature. Hence, hydrogenated polybutadiene having the characteristics defined herein is particularly suited to the construction of expellant bags or bladders for rocket propellant tanks in which the bag or bladder is in contact with liquefied gases such as liquefied oxygen which vaporize at extremely low temperatures (−298° F.).

The polymers which, after hydrogenation, are suitable for manufacturing the bag or bladder of the invention must be selected from homopolymers of butadiene and copolymers of butadiene and styrene using not more than 30 parts by weight of styrene per 100 parts by weight of monomers. These polymers are prepared by emulsion polymerization, the temperature for the polymerization ranging from −5° to 140° F. and preferably from 20° to 60° F. Polymers produced at about 41° F., when hydrogenated as required, have the most desirable properties. The polymers to be hydrogenated should have a Mooney viscosity below 40 (ML–4) measured at 212° F. Where the Mooney viscosity is above 40, it is preferable to mill or otherwise degrade the polymer prior to hydrogenation.

It has been found that the hydrogenation process is simplified and that better products are produced if the polymer is vacuum dried or is dried in the presence of an inert atmosphere at a temperature not above 150° F. Air drying at temperatures around 220° F. has been used but it is not as satisfactory since, in general, the hydrogenation of a polymer so dried does not proceed as rapidly nor to as high a degree of saturation when it is air dried at the higher temperature. Thorough washing of the polymer is desirable following coagulation. Polymers can be recovered by adding a coagulant to a mixture of the latex and a solvent for the polymer. The polymer is recovered as a solution suitable for hydrogenation.

Catalysts suitable for the hydrogenation step include nickel-kieselguhr, Raney nickel, copper chromate, molybdenum sulfide, finely divided platinum or palladium, platinum oxide, copper-chromium oxide, and the like. However, nickel-kieselguhr is far superior to the others named and this particular catalyst is most effective when prepared in the preferred manner described below.

A finely divided nickel-kieselguhr catalyst having a particle size in the range of 1 to 8 microns which has been activated at a temperature in the range of 500 to 800° F. for a period of several hours by passing hydrogen thereover is highly effective. Treatment of the catalyst at 675° F. for about 4 hours using approximately 100 volumes of hydrogen per volume of catalyst produces an excellent catalyst. Such a treatment reduces at least a part of the nickel compound to elemental nickel, generally 35 to 40 percent of the nickel being reduced; however, the reduced nickel content is not critical and may vary from approximately 10 to approximately 50 percent. In the hydrogenation of the polymer, 2 to 30 weight percent of the catalyst on the unreduced basis, based upon the weight of the polymer, effects the most desirable rate of hydrogenation.

Hydrogenated polybutadiene meeting the requirements of the invention can be produced from the required polymer using the following range of hydrogenating conditions. Reaction pressures are preferably in the range from atmospheric to 3000 p. s. i. g., the most desirable range being within 100 to 1000 p. s. i. g. The temperature can range from 75° F. up to the degradation temperature of the polymer, maximum temperatures ranging as high as 700 to 1000° F. The preferred range is between 300 and 600° F. Degradation has not been noted even when hydrogenation was carried out at 600° F. and a pressure of 2500 p. s. i. g., based on intrinsic viscosity tests. Reaction times in the range of 1 to 24 hours, preferably 2 to 8 hours, can be employed. In the usual case no further hydrogenation takes place after 2 or 3 hours. The amount of catalyst required is also a function of the temperature of hydrogenation; i. e., 10 percent by weight of catalyst at 500° F. produces approximately the same effect that 15 percent gives at 400° F.

In order to obtain polymers of the desired characteristics, the unsaturation should be reduced to a value below about 30 percent based upon the theoretical value of 100 percent for the unhydrogenated butadiene polymer. If the hydrogenated material is to be vulcanized, the residual unsaturation should be within the range of 15 to 30 percent, vulcanization being difficult when the polymer has an unsaturation below 10 percent. Hydrogenated polymers having an unsaturation above about 30 percent have low resistance to oxidation and are not suitable for use in contact with oxygen.

Hydrogenated polybutadiene to be used in the device of the invention is a white, solid material when precipitated from solution, being similar in appearance to asbestos fibers. On molding, the products are colorless and transparent. The hydrogenated products are lighter in color than the unhydrogenated starting material. The hydrogenated polymers are very tough and have greater tensile strength than the starting materials, the tensile strengths being in the range of 750 to 4000 p. s. i., measured on the uncompounded stock at 80° F. and the elongation of these hydrogenated materials is greater than 500 percent. It has been found that the second order transition temperature of the class of hydrogenated polybutadienes described herein, sometimes referred to as the glassy state transition, is below the boiling point of liquid oxygen at atmospheric pressure.

In carrying out the hydrogenation of the selected polymer, I charge the butadiene polymer, substantially free of salts or other materials which might act as hydrogenation catalyst poisons, to a suitable hydrogenation reactor in the form of a solution or dispersion in a suitable solvent. In some instances the polymer dissolves completely, while in other cases a dispersion is formed. This appears to be a function of the particular polymer. The solvent is preferably inert to hydrogenation but this is not an absolute requirement, since unsaturated materials can be used. When aromatic solvents are used, they are usually hydrogenated concomitantly with the polymer. In such a case the solvent is frequently recovered and recycled to the hydrogenation process.

Suitable solvents include saturated cyclic hydrocarbons such as cyclohexane, methylcyclohexane, decalin, and the like, preferably boiling above atmospheric temperature. Aromatic hydrocarbons, such as benzene and toluene; cyclic ethers, such as dioxane; and paraffinic hydrocarbons such as isooctanes, isoheptanes, and normal heptane; hydroaromatic hydrocarbons such as tetralin; and the like, may also be used. Mixtures of solvents and/or dispersants may be used if desired.

In one embodiment, after the polymer has been dissolved in the solvent, the hydrogenation catalyst is added, hydrogen is added, and the temperature raised to a suitable level to initiate the reaction. This operation may be carried out in a batch-wise or a continuous process. When sufficient hydrogenation has been effected, usually as indicated by a decrease in unsaturation or a drop in hydrogen pressure, the reaction is stopped and the dispersion or solution treated by suitable means, such as by filtering, centrifuging, and the like, to remove the catalyst. The magnetizable catalyst may be removed very advantageously by passing the solution or dispersion after hydrogenation through a packing which has been energized with a high field flux by either permanent or electro-magnets. A suitable device is a tube packed with fine steel wool, fine magnetic rings, fine magnetic screens, etc., on the outside of which are the magnets. Demagnetizing the packing permits removal of the catalyst particles from the packing. The hydrogenated thermoplastic is then separated from the solvent or dispersing medium. Either the catalyst or the solution of polymer may be added in increments after the reaction temperature has been reached.

When the reaction is carried out in a continuous manner, a solution of the polymer containing the catalyst in suspension is introduced into a tubular reactor and hydrogen is introduced into the reaction zone at one or more points. The reaction may also be carried out in a stirred autoclave by continuously introducing the reactants and continuously removing the products.

The following example illustrates the hydrogenated polybutadiene of the invention which has high utility in the form of thin-walled bags or bladders for use at extremely low temperatures under conditions requiring the flexing of the material. It should be understood that the materials, quantities, temperatures, pressures, etc., set forth are illustrative and should not be construed as unduly limiting the invention.

Example

Polybutadiene was prepared by emulsion polymerization of butadiene at 41° F. The following recipe was used.

| | Parts by weight |
|---|---|
| Water | 180 |
| Butadiene | 100 |
| Sodium alkaryl sulfonate | 1.5 |
| Diisopropylbenzene hydroperoxide | 0.097 |
| Mercaptan blend [1] | 0.065 |
| KOH | 0.04 |
| $K_4P_2O_7$ | 0.177 |
| $FeSO_4 \cdot 7H_2O$ | 0.14 |

[1] A blend of tertiary $C_{12}$, $C_{14}$, and $C_{16}$ aliphatic mercaptans in a ratio of 3 : 1 : 1 parts by weight.

The polymer had a Mooney viscosity of 29.

This polybutadiene was purified and hydrogenated by the following procedure:

Sixteen grams of polybutadiene in the form of a 3.2 weight percent solution in methylcyclohexane was charged to a hydrogenation reactor along with a reduced nickel on kieselguhr catalyst [1] and the reactor pressured to 1500 p. s. i. g. with hydrogen. The temperature of the reactor was then slowly raised to 200° F. and maintained at that level for 24 hours. The solution was then filtered to remove catalyst and the product recovered. The product had an unsaturation value of 3.33 percent and had a carbon content of 85.24 percent and a hydrogen content of 14.05 percent.

The specific hydrogenated polybutadiene described herein may be fabricated by any of the methods known in the art into bags or bladders of the desired shape and size for use in containing, dispensing or otherwise contacting low temperature fluids under conditions requir-

[1] Ten to 15 grams of nickel hydroxide on kieselguhr catalyst was reduced with hydrogen at 650° F. for 4 hours and quenched with 250 cc. of methylcyclohexane. The resulting suspension was used as the catalyst. The catalyst when completely reduced had a nickel content of 75 weight percent.

ing flexing of the bag. A preferred method of forming the bag or bladder is by dipping a form of suitable shape and size into a solution of hydrogenated polybutadiene as a latex-like fluid. The bag or bladder may also be made from suitable sections or pieces by heat-sealing or electronically sealing the pieces together. After fabrication or formation, the bag or bladder is then attached to any dispensing device conventionally used for dispensing low temperature fluids. It is also feasible to construct the bladder or bag of cotton, nylon, or other suitable fabric which is flexible and unreactive at low temperature, and impregnate or coat the bag with the hydrogenated polybutadiene meeting the requirements of the invention.

I have found that hydrogenated polybutadiene of the class described herein in the form of thin film remains sufficiently flexible in liquid oxygen to function satisfactorily as rocket propellant tank expellant bags. Uncompounded stock of hydrogenated polybutadiene if 5 percent unsaturation from 26 ML-4 polybutadiene rubber was submerged in liquid nitrogen at $-315°$ F. for 4 hours. The sample was removed and immediately bent around a $\frac{1}{4}''$ mandrel and did not break over a 180° bend.

A more complete understanding of the invention may be had from a consideration of the accompanying drawing of which Figure 1 is a pictorial view showing a cutaway section of a rocket propellant tank in combination with the bladder of the invention; and Figure 2 is a longitudinal cross sectional view of another embodiment of a liquid dispensing tank in combination with a hydrogenated polybutadiene bladder. The views are diagrammatic and similar elements are correspondingly designated in the two figures.

Referring to Figure 1, a generally cylindrical tank 10 is equipped with a take-off line 12 to which are connected inside the tank a perforate ring conduit 14 and an elongated perforate conduit 16 for pick-up of fluid along the end and side of the tank, respectively. An inlet line 18 for a pressurizing gas connects axially with the end of the tank opposite the outlet end. A perforate dispensing tube 20 connects with the end of line 18 and extends substantially the length of the tank. A flexible bag or bladder 22 comprising hydrogenated polybutadiene film encloses perforate tube 20 and is sealed to this tube or to the end of conduit 18 by means of clamp 24. Conduit 18 is threaded into a screw-out plug 25 which permits insertion of tube 20 and bladder 22 through the end of the tank. Conduits 14 and 16 are constructed of a chemically resistant alloy or of a suitable hard plastic, such as polyethylene. Tank 20 is constructed of stainless steel or any other strong rigid material which is impervious and unreactive with the particular liquid propellant utilized in the tank. Tube 20 may also be constructed of a suitable alloy or other rigid inert composition so that in the event the bladder is broken the perforate tube will not be attacked. It is also feasible to construct tank 10 of ordinary steel or iron and line the same with an inert plastic or glass lining or coating.

When the device of Figure 1 is utilized in dispensing liquid oxygen this liquefied gas is introduced to the tank through line 12 through a valve (not shown). Prior to filling of tank 10 with liquid oxygen, bladder 22 is inserted in folded condition closely around distributing tube 20. When it is desired to expel liquid oxygen from the tank, a valve (not shown) in line 18 is opened to a source of pressurizing gas and the valve in line 12, utilized in filling the tank, is opened so that pressurizing gas entering bladder 22 through perforate tube 20 places a pressure on the liquid in the tank and forces the same to pass through outlet line 12 regardless of the position of the tank.

Referring to Figure 2, a tank 10 is provided with an outlet line 12 and an inlet line 18 each of which is connected with the tank at opposite ends by a sealing assembly 28. In this modification, bladder 22 comprising hydrogenated polybutadiene in accordance with the invention is sealed to the outlet of tank 10 by means of a stopper or plug 30 which wedges the mouth of the bag against the neck of the tank outlet. Stopper 30 is slightly tapered and is wedged into the mouth of the tank outlet by means of a screw cap 32. Conduit 12 extends through both cap 32 and plug 30 so as to communicate with the interior of bag 22. Bag 22 is constructed approximately the size and shape of the interior of the tank or container 10 and when filled with the propellant such as liquid oxygen the closed end of the bag rests against an obturating piston 26 which engages the cylindrical wall of the tank. Pressurizing gas introduced through line 18 exerts a forward pressure on piston 26 so as to gradually collapse bag 22 as the propellant or other liquid is forced out through conduit 12.

Certain modifications of the invention will become apparent to those skilled in the art and the illustrative details disclosed are not to be construed as imposing unnecessary limitations on the invention.

I claim:

1. A tank adapted to feed liquid oxygen to a combustion zone without interruption regardless of the position of the tank comprising in combination a rigid container having a pressurizing gas inlet line extending almost through the interior of said container and a liquid oxygen outlet line; perforate conduit means for passing liquid oxygen from any portion of said container to said outlet line comprising a perforate conduit extending along the inside wall of said container generally parallel to said gas inlet line and a ring conduit extending around the inside wall of said container adjacent one end of said perforate conduit, both said conduits being connected with said outlet line; a bladder enclosing that portion of said inlet line within said container in sealed relation therewith, said bladder being constructed of hydrogenated polymer of the group consisting of homopolymers of butadiene and copolymers of butadiene and styrene containing not more than 30 weight percent styrene based on the weight of the monomers, the unsaturation of said polymer being below about 30% based upon a theoretical value of 100% for the unhydrogenated polybutadiene and being substantially the size and shape of said container when filled out; and perforations in said portion of line for passing fluid into said bladder so as to fill out same and expel said liquid oxygen from said container.

2. The bladder or bag of claim 1 constructed of hydrogenated homopolymers of butadiene.

3. The bladder or bag of claim 1 constructed of hydrogenated copolymer of butadiene and styrene.

4. The tank defined by claim 1 wherein said bladder further comprises a fabric bag, flexible at low temperatures and coated with an impervious layer of said hydrogenated polymer.

5. A tank adapted to deliver a liquid to an outside point of use without interruption regardless of the position of the tank comprising in combination, a rigid closed cylindrical shell having an axial conduit extending from the interior of said shell thru one end thereof, said conduit being perforate within said shell; an imperforate bladder enclosing said axial conduit in sealed relation therewith, collapsible around said axial conduit and expandible to fill said shell; and a liquid delivery system comprising an elongated perforate conduit extending along the inner wall of said shell substantially the length of said shell, a perforate ring conduit extending around the inner circumference of said shell, and a delivery conduit connected to said ring conduit and to said elongated conduit.

6. The tank of claim 5 wherein the ring conduit is positioned adjacent the end of said shell opposite the end thru which said axial conduit extends.

7. The tank of claim 5 including a screw-out plug in the end of said shell into which said axial conduit is threaded.

8. The tank of claim 5 wherein said bag is constructed of hydrogenated polymer of the group consisting of homopolymers of butadiene and copolymers of butadiene and styrene containing not more than 30 weight percent styrene based on the weight of the monomers, the unsaturation of said polymer being below about 30% based upon a theoretical value of 100% for the unhydrogenated polybutadiene.

References Cited in the file of this patent

UNITED STATES PATENTS

| | | |
|---|---|---|
| 1,939,611 | Purvis | Dec. 12, 1933 |
| 2,505,798 | Skinner | May 2, 1950 |
| 2,653,552 | Geeraert | Sept. 29, 1953 |
| 2,693,461 | Jones | Nov. 2, 1954 |

OTHER REFERENCES

Jones et al. article: "Hydrogenated Synthetic Elastomers," in May 1953 "Industrial and Engineering Chemistry."